(12) United States Patent
Pradas et al.

(10) Patent No.: US 12,501,308 B2
(45) Date of Patent: Dec. 16, 2025

(54) MAPPING DATA PACKETS TO DATA RADIO BEARERS BASED ON CORRESPONDING PACKET DELAY BUDGETS

(71) Applicant: Telefonaktiebolaget LM Ericsson (publ), Stockholm (SE)

(72) Inventors: Jose Luis Pradas, Stockholm (SE); Du Ho Kang, Sollentuna (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 300 days.

(21) Appl. No.: 18/278,755

(22) PCT Filed: Feb. 23, 2022

(86) PCT No.: PCT/EP2022/054541
§ 371 (c)(1),
(2) Date: Aug. 24, 2023

(87) PCT Pub. No.: WO2022/180104
PCT Pub. Date: Sep. 1, 2022

(65) Prior Publication Data
US 2024/0137801 A1    Apr. 25, 2024
US 2024/0236756 A9    Jul. 11, 2024

Related U.S. Application Data

(60) Provisional application No. 63/153,722, filed on Feb. 25, 2021.

(51) Int. Cl.
*G06F 15/16* (2006.01)
*H04W 28/02* (2009.01)

(52) U.S. Cl.
CPC ... *H04W 28/0268* (2013.01); *H04W 28/0263* (2013.01); *H04W 28/0273* (2013.01)

(58) Field of Classification Search
CPC .............. H04L 47/24; H04W 28/0268; H04W 28/0263; H04W 28/0273
See application file for complete search history.

(56) References Cited

U.S. PATENT DOCUMENTS

2011/0214157 A1*  9/2011  Korsunsky .......... H04L 63/1458
                                                       726/1
2018/0219789 A1*  8/2018  Chaudhuri .............. H04L 47/31
(Continued)

FOREIGN PATENT DOCUMENTS

WO    2018/159959 A1    9/2018
WO    2018/174521 A1    9/2018
WO    2018/202205 A1    11/2018

OTHER PUBLICATIONS

International Search Report and Written Opinion with Transmittal dated Jun. 1, 2022 issued in International Patent Application No. PCT/EP2022/054541 (12 pages).
(Continued)

*Primary Examiner* — Razu A Miah
(74) *Attorney, Agent, or Firm* — Rothwell, Figg, Ernst & Manbeck, P.C.

(57) ABSTRACT

The invention refers to a method being performed by a wireless device, UE, to forward data of an application patent unit, PDU, the application PDU being generated by an application in the UE, wherein this wherein the UE performs the steps of: segmenting (100) the application PDU into a plurality of data packets, determining (101) one or a plurality of Quality-of-Service, QoS, parameters associated to the application PDU, determining (102) that different data packets need a different forwarding treatment to comply with the one or the plurality of QoS parameters, and mapping (103) the different data packets to different data radio bearers, DRBs, or providing a different treatment for forwarding in one DRB; the invention further refers to corresponding (Continued)

methods in a code network and in a radio access, RAN node; the invention further relates to a corresponding UE, a core network node and a RAN node.

18 Claims, 12 Drawing Sheets

(56) References Cited

U.S. PATENT DOCUMENTS

| | | | |
|---|---|---|---|
| 2020/0359265 A1* | 11/2020 | Azizi | H04L 47/2416 |
| 2021/0058819 A1* | 2/2021 | Ozturk | H04W 72/56 |
| 2021/0289545 A1* | 9/2021 | Gorajala Chandra | H04L 43/0876 |
| 2022/0321474 A1* | 10/2022 | Purushothaman | H04L 63/0245 |

OTHER PUBLICATIONS

LG Electronics Inc., "Corrections on SDAP architecture and functionality", R2-1709072, 3GPP TSG-RAN WG2 #99, Berlin, Germany, Aug. 21-25, 2017, XP051318864 (4 pages).

* cited by examiner

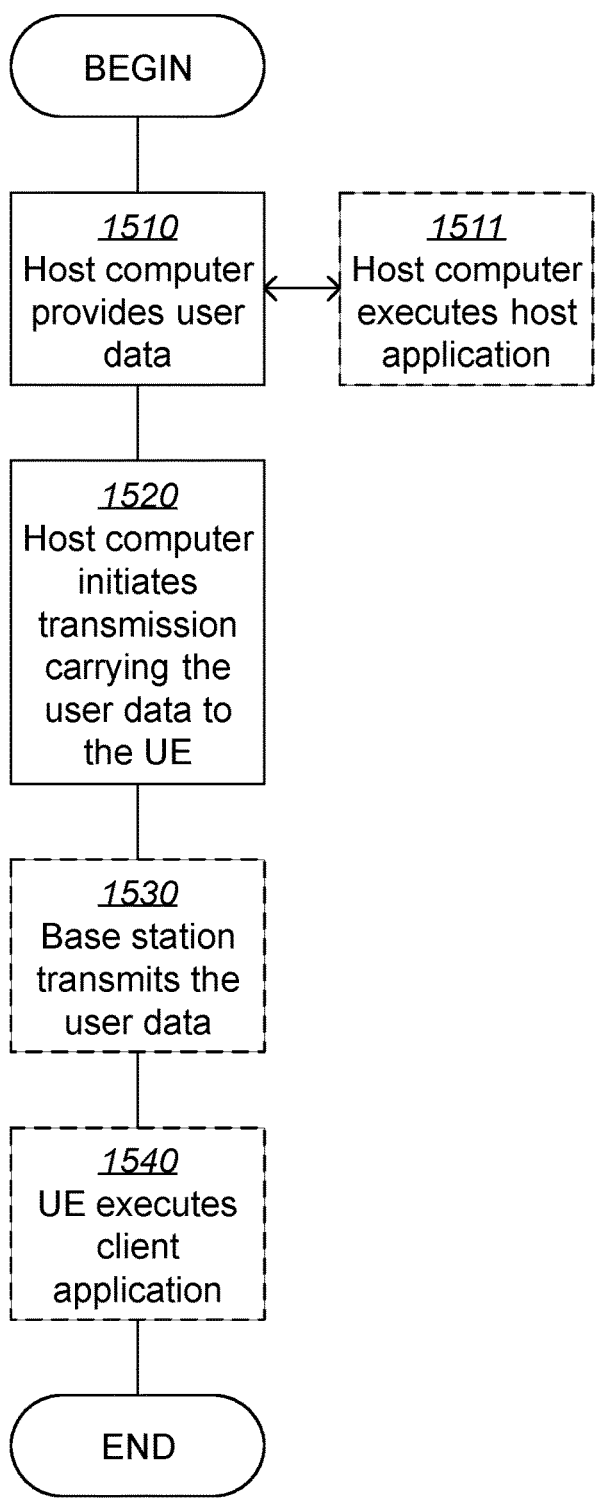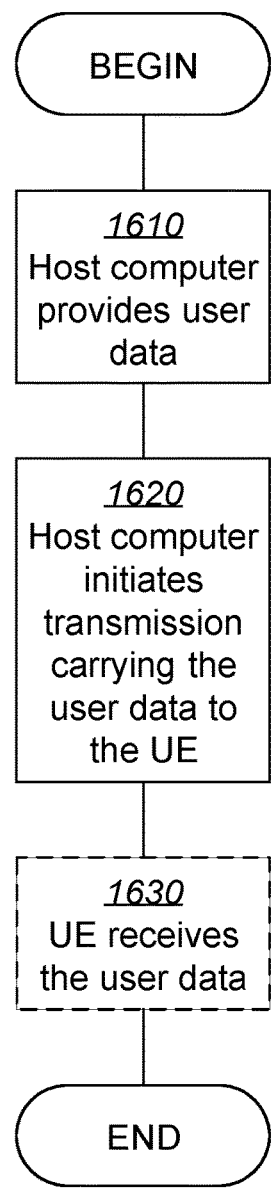
FIG. 15                                   FIG. 16

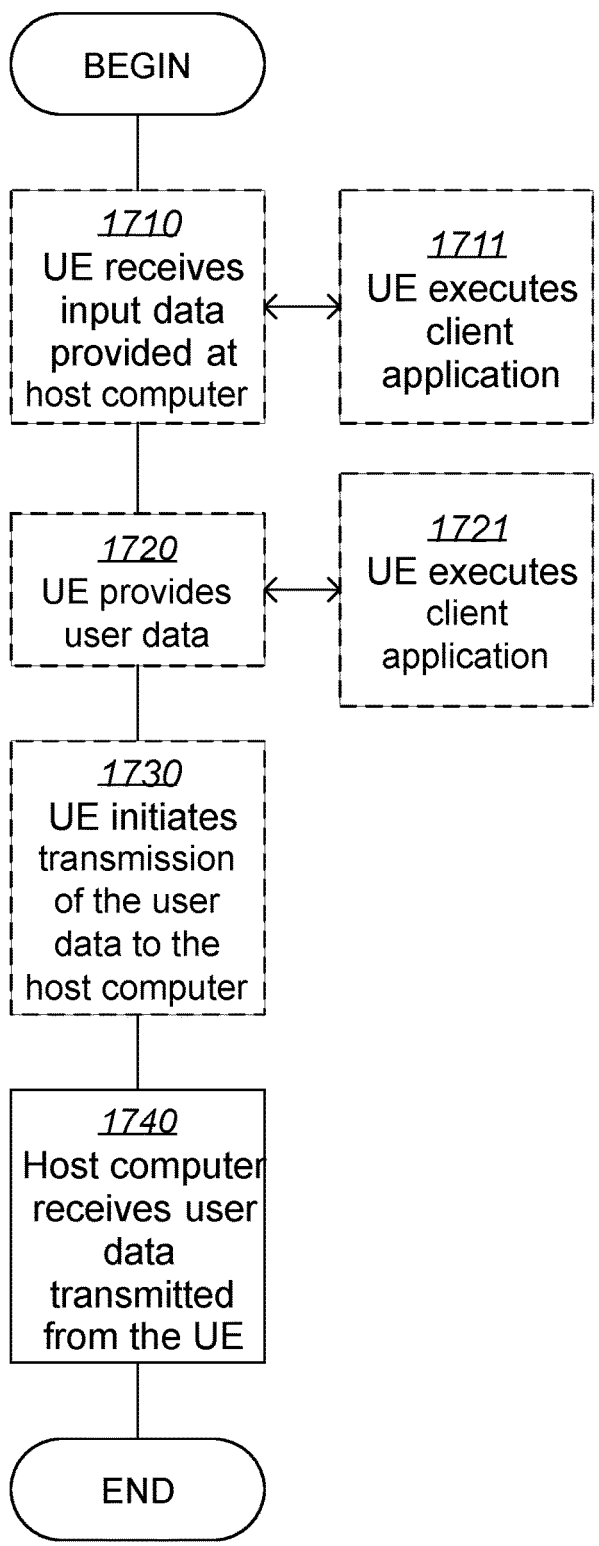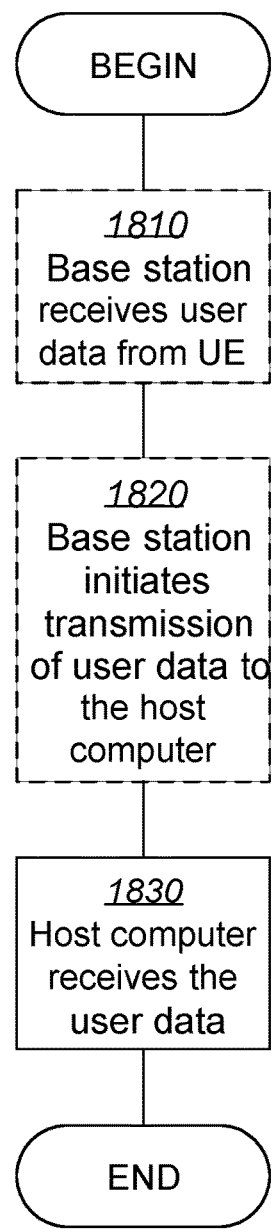
FIG. 17
FIG. 18

MAPPING DATA PACKETS TO DATA RADIO BEARERS BASED ON CORRESPONDING PACKET DELAY BUDGETS

CROSS REFERENCE TO RELATED APPLICATIONS

This application is a 35 U.S.C. § 371 National Stage of International Patent Application No. PCT/EP2022/054541, 2022 Feb. 23, which claims priority to U.S. provisional patent application No. 63/153,722, filed on 2021 Feb. 25, which is incorporated by this reference.

TECHNICAL FIELD

The present application relates generally to the field of wireless communication networks, and more specifically to QoS flow handling.

BACKGROUND 5G is the fifth generation of mobile communications, addressing a wide range of use cases from enhanced mobile broadband (eMBB) to ultra-reliable low-latency communications (URLLC) to massive machine type communications (mMTC). 5G includes the New Radio (NR) access stratum interface and the 5G Core Network (5GC). The NR physical and higher layers are reusing parts of the LTE specification, and to that add needed components when motivated by new use cases.

Low-latency high-rate applications such as eXtended Reality (XR) and cloud gaming are important in 5G era. XR may refer to all real-and-virtual combined environments and human-machine interactions generated by computer technology and wearables. It is an umbrella term for different types of realities including Virtual reality (VR), Augmented reality (AR), Mixed reality (MR), and the areas interpolated among them. The levels of virtuality range from partially sensory inputs to fully immersive VR.

5G NR is designed to support applications demanding high rate and low latency in line with the requirements posed by the support of XR and cloud gaming applications in NR networks. 3GPP Release 17 contains a study item on XR Evaluations for NR. The main objectives are to identify the traffic model for each application of interest, the evaluation methodology and the key performance indicators of interest for relevant deployment scenarios, and to carry out performance evaluations accordingly in order to investigate possible standardization enhancements in potential follow-up SI/WI.

The low-latency applications like XR and cloud gaming require bounded latency, not necessarily ultra-low latency. The end-to-end latency budget may be in the range of 20-80 ms, which needs to be distributed over several components including application processing latency, transport latency, radio link latency, etc. For these applications, short transmission time intervals (TTIs) or mini-slots targeting ultra-low latency may not be effective.

FIG. 1 shows an example of frame latency for 3 different users measured over a radio access network (RAN), wherein the frame latencies shown here exclude application & core network latencies. It can be seen that there exist several frame latency spikes being marked by dots. The reason for the latency spikes may include queuing delays, time-varying radio environments, time-varying frame sizes. Tools that can help to remove latency spikes are desired to enable better 5G support for this type of traffic.

Applications like XR and cloud gaming require bounded latency requirements as well as a high transmission data rate. This can be seen from the large frame sizes originating from this type of traffic. The typical frame sizes may range from tens of kilobytes to hundreds of kilobytes. The frame arrival rates may be 60 or 120 frames per second (fps). As a concrete example, a frame size of 100 kilobytes and a frame arrival rate of 120 fps can lead to a rate requirement of 95.8 Mbps.

A large video frame is usually fragmented into smaller IP packets and transmitted as several transport blocks (TBs) over several TTIs in RAN. FIG. 2 shows an example of the cumulative distribution functions of the number of transport blocks required to deliver a video frame with size ranging from 20 KB to 300 KB. For example, FIG. 2 shows that for delivering the frames with a size of 200 KB each, the median number of needed TBs is 5.

The characteristics of XR traffic arrival are quite distinct from typical web-browsing and Voice-over-IP, VoIP traffic as exemplarily shown in FIG. 3. It is well expected that the arrival time is quasi-periodic and largely predictable similar to VoIP. However, its data size is order of magnitude larger than for VoIP, as discussed above. Similar to web-browsing, the data size is expected to be different at every application PDU arrival instance due to dynamics of contents and/or human interactivity with respect to the application.

QoS Framework in 5G:

5G has introduced a new QoS model based on QoS flows. The QoS Flow is the finest granularity of QoS differentiation in the PDU Session and a is identified by a QoS Flow ID (QFI). Thus, a QFI is unique within a PDU session. A QoS Flow is associated with QoS requirements as specified by QoS parameters and QoS characteristics. A QoS Flow is controlled by the Session Management Function (SMF) and may be preconfigured, or established via the PDU Session Establishment procedure, or the PDU Session Modification procedure (see TS 23.502). User Plane traffic with the same QFI within a PDU Session receives the same traffic forwarding treatment such as, for instance, scheduling or admission control.

A QoS Flow is characterised by a QoS profile, one or more QoS rule(s) and optionally QoS Flow level QoS parameters, and one or more UL and DL Packet Detection Rules PDR(s). Each QoS profile has one corresponding QoS Flow identifier (QFI).

Any QoS profile for a flow may include the following QoS parameters:

5G QoS Identifier (5QI); and

Allocation and Retention Priority (ARP).

In addition, for a GBR QoS Flow only, the QoS profile shall also include the QoS parameters Guaranteed Flow Bit Rate (GFBR) (UL and DL) and Maximum Flow Bit Rate (MFBR) (UL and DL). Optionally, Notification control and Maximum Packet Loss Rate (UL and DL) may be also included.

On the other hand, for a non-GBR QoS Flow only, the QoS profile may include the QoS parameter Reflective QoS Attribute (RQA).

A 5QI is a scalar that is used as a reference to 5G QoS characteristics. Standardized 5QI values have 1-to-1 mapping to a standardized combination of QoS characteristics. These characteristics describe the packet forwarding treatment the corresponding QoS Flow receives edge-to-edge between the UE and the UPF e.g. in terms of the following performance characteristics:

1. Resource Type (GBR, Delay critical GBR or Non-GBR);

2. Priority Level;
3. Packet Delay Budget (including Core Network Packet Delay Budget);
4. Packet Error Rate;
5. Averaging window (for GBR and Delay-critical GBR resource type only);
6. Maximum Data Burst Volume (for Delay-critical GBR resource type only).

These QoS characteristics are used by the RAN to configure the different RAN nodes, protocols, and configurations to be able to meet these characteristics. However, these characteristics do not mandate any specific behavior or configuration in the RAN nodes.

QoS Enabler in RAN:

In RAN (Radio Access Network) NR (New Radio), a new layer, SDAP (Service Data Adaptation Protocol), has been specified as an enabler and part of the QoS model. On important function of the SDAP layer is marking and mapping the QoS flows into different Data Radio Bearers, DRBs. To perform this, the RAN is provided with the QFI of a QoS flow in the encapsulation header on N3 (and N9) reference point (or interface), wherein N3 is the reference point between the access network (or RAN node) and the UPF, and N9 is the reference point between two UPFs.

In the downlink, DL, the RAN perfoms the mapping between QFI to DRBs, so for each QFI/user data packet pair, the SDAP, selects the DRB and sends the user data to lower layers and, in case that the RAN uses the SDAP layer, the QFI carried over the N3/N9 interface may then be introduced into the SDAP header.

In the uplink, UL, the UE performs the classification and marking of UL user plane traffic based on QoS rules. These QoS rules may be explicitly provided to the UE through the PDU Session Establishment/Modification procedure, preconfigured in the UE or implicitly derived by the UE by applying Reflective QoS. A QoS rule contains among other information, the QFI of the associated QoS Flow and a Packet Filter Set.

According to the prior art, all IP packets associated to an application PDU are marked with the same QFI since they belong to the same QoS flow. This means that all packets will receive the same forwarding treatment and all the packets will share the same QoS characteristics.

If, however, all the packets share the same QFI and, thus, the same QoS parameters, all packets need to be configured with those QoS parameters that are required for the packet which encounters the most stringent (delay) requirement. This imposes corresponding stringent requirements for the RAN that may requires large network capacities.

SUMMARY

Exemplary embodiments disclosed herein address at least some of these problems, issues, and/or drawbacks of existing solutions.

Solutions provided in the applications result from an insight that current QoS handling of (user) data packets may lead to overprovisioning of network resources, as many data packets associated to a PDU session can be treated with less stringency without compromising the required application quality.

According to an embodiment, a method is provided being performed by a wireless device, UE, to forward data of an application patent unit, PDU, the application PDU being generated by an application in the UE, wherein this wherein the UE performs the steps of:

segmenting the application PDU into a plurality of data packets,
determining one or a plurality of Quality-of-Service, QoS, parameters associated to the application PDU,
determining that different data packets need a different forwarding treatment to comply with the one or the plurality of QoS parameters, and
mapping the different data packets to different data radio bearers, DRBs, or providing a different treatment for forwarding in one DRB.

According to another embodiment, a method is provided being performed by a User Plane Function, UPF of a core network, wherein the UPF receives an application packed data unit, PDU, from an application function of another device or node, wherein the UPF performs the steps of:

segmenting the application PDU into a plurality of data packets,
determining one or a plurality of Quality-of-Service, QoS, parameters associated to the application PDU,
determining that different data packets need a different forwarding treatment (or shall be differently treated to comply with the one or the plurality of QoS parameters,
transmitting the plurality of data packets to a radio access network, RAN, node for transmitting the data packets to the UE, and
indicating the need for the different forwarding treatment of the different data packets to the RAN node.

According to another embodiment, a method performed by a Radio Access Network, RAN, node, wherein the RAN node performs the steps of:

receiving a plurality of data packets associated to an application PDU from a User Plane Function, UPF, of a core network,
receiving an indicating from the UPF about (a need for) a different forwarding treatment of the different data packets to a wireless device, UE,
mapping the different data packets to different data radio bearers, DRBs according the need for a different forwarding treatment, or providing a different treatment for forwarding in one DRB, and
transmitting the data packets.

According to another embodiment, a UE is provided comprising:

radio interface circuitry configured to communicate with a network node via at least one cell; and
processing circuitry operably coupled to the radio interface circuitry;
whereby the processing circuitry and the radio interface circuitry are configured to segmenting the application PDU into a plurality of data packets, determining one or a plurality of Quality-of-Service, QoS, parameters associated to the application PDU, determining that different data packets need a different forwarding treatment to comply with the one or the plurality of QoS parameters, and mapping the different data packets to different data radio bearers, DRBs, or providing a different treatment for forwarding in one DRB.

According to another embodiment, a UPF of a core network node is provided comprising:

an interface circuitry configured to communicate with a radio access network, RAN, node; and
processing circuitry operably coupled to the interface circuitry,
whereby the processing circuitry and the interface circuitry are configured to receiving a plurality of data packets associated to an application PDU from a User Plane Function, UPF, of a core network, receiving an indicating from the UPF about (a need for) a different forwarding treatment of the different data packets to a wireless device, UE, mapping the different data packets to different data radio bearers, DRBs according the need for a different forwarding treatment, or providing a different treatment for forwarding in one DRB, and transmitting the data packets.

According to another embodiment, a RAN node is provided comprising:
radio interface circuitry configured to communicate with a UE;
an interface circuitry configured to communicate with a UPF of a core network;
processing circuitry operably coupled to interface circuitries;
whereby the processing circuitry and the interface circuitries being configured to receiving a plurality of data packets associated to an application PDU from a User Plane Function, UPF, of a core network, receiving an indicating from the UPF about (a need for) a different forwarding treatment of the different data packets to a wireless device, UE, mapping the different data packets to different data radio bearers, DRBs according the need for a different forwarding treatment, or providing a different treatment for forwarding in one DRB, and transmitting the data packets.

By considering application QoS requirements and how these QoS requirements map on each of the segmented IP packets of a given application PDU, the network is able to prioritize traffic dynamically, maximizing the utilization of the network resources in the best possible way; yet, meeting the QoS of the different services supported by the network. This can also result in an increase of the network capacity and network performance.

These and other objects, features and advantages of the present disclosure will become apparent upon reading the following Detailed Description in view of the Drawings briefly described below.

BRIEF DESCRIPTION OF THE DRAWINGS

FIG. 15 is a flowchart depicting embodiments of a method in a communications system including a host computer, a base station and a user equipment.

FIG. 16 is a flowchart depicting embodiments of a method in a communications system including a host computer, a base station and a user equipment.

FIG. 17 is a flowchart depicting embodiments of a method in a communications system including a host computer, a base station and a user equipment.

FIG. 18 is a flowchart depicting embodiments of a method in a communications system including a host computer, a base station and a user equipment.

DETAILED DESCRIPTION

Figure 1:
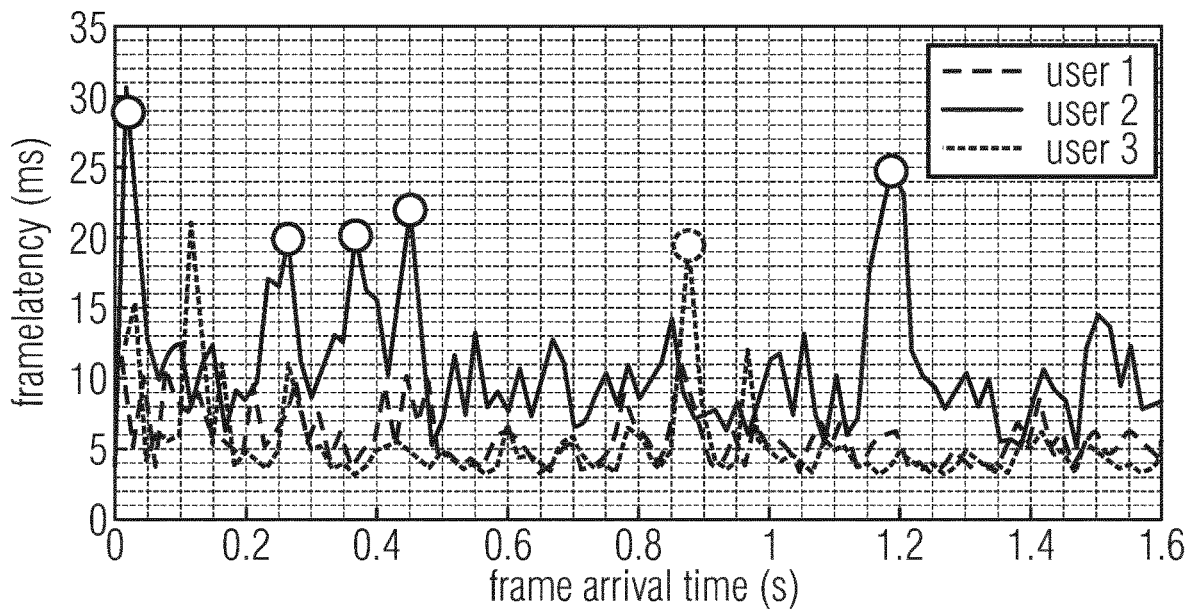
FIG. 1 shows an example of frame latency measured over a radio access network.
Figure 2:
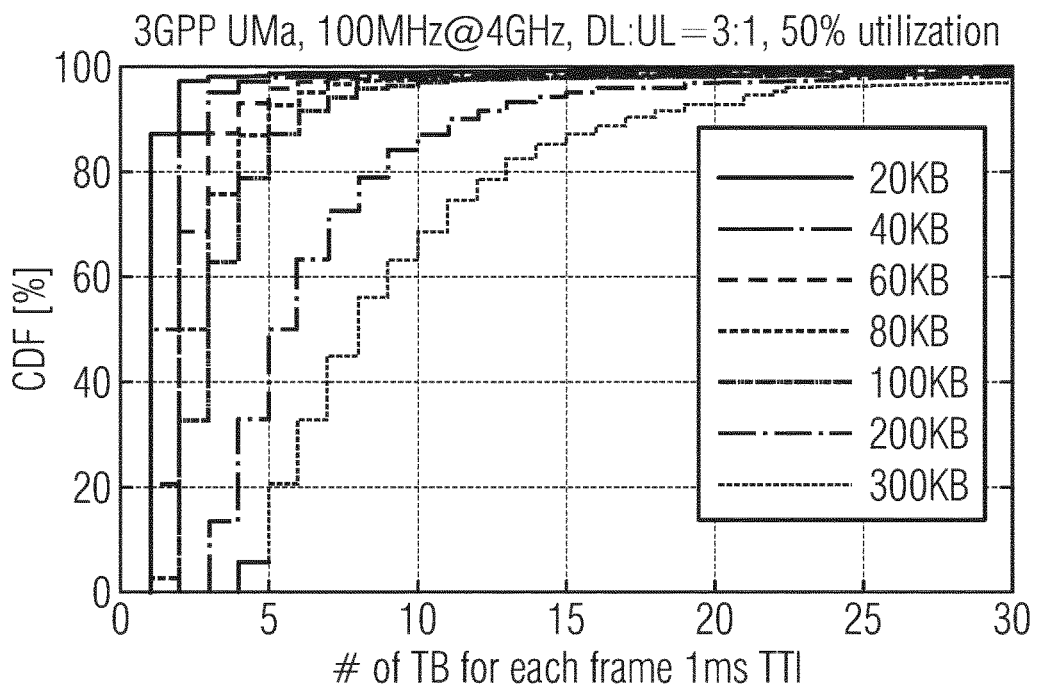
FIG. 2 depicts an example of the cumulative distribution functions of the number of transport blocks required to deliver a video frame.
Figure 3:
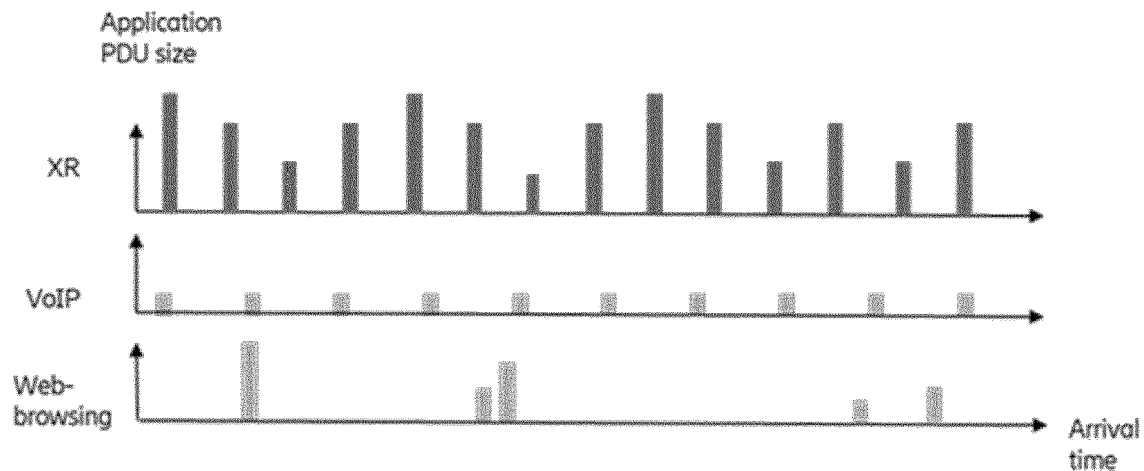
FIG. 3 depicts XR traffic characteristics compared to VoIP and Web-browsing.

The following terms are used throughout the description given below:
Wireless Device, UE: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using radio waves, and/or other types of signals suitable for conveying information through air.
Radio Access (Network), RAN, Node: As used herein, a "radio access node", NB, or "radio access network node" can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, a relay node, and a non-terrestrial access node (e.g., satellite or gateway).
Core Network Node: As used herein, a "core network node" is any type of node in a core network. Some examples of a core network node include, e.g., a User Plane Function (UPF), a Mobility Management Entity (MME), a Packet Data Network Gateway (P-GW), a Service Capability Exposure Function (SCEF), or the like.

It may be noted that the description given herein focuses on a 3GPP cellular communications system and, accordingly, 3GPP terminology or terminology similar to 3GPP terminology is used throughout this document. However, the present invention may as well be implemented in communication technologies like Wide Band Code Division Multiple Access (WCDMA), Worldwide Interoperability for Microwave Access (WiMax), Ultra Mobile Broadband (UMB).

In addition, functions and/or operations described herein as being performed by a wireless device, a RAN node or a UPF may be distributed over a plurality of wireless devices and/or network nodes.

The solution may comprise indicating different QFIs or QoS profiles and/or using different DRBs for packets within the same flow depending on the certain aspects of the application PDU.

According to the second alternative, the solution comprises using different DRBs for data packets of the same application PDU on certain aspects of the application PDU such as an application PDU latency budget (a time when the application should have successfully reached the receiver).

According to the first alternative, a preferential transmission treatment in lower (RAN) layers (e.g. PDCP, RLC or MAC layer) to specific packets depending on the different QFI or priority indication is provided. Accordingly, a preferential treatment may be performed in any of the PDCP, RLC or MAC layer. For example, packets may be treated differently depending on corresponding certain aspects of the application PDU such as the application PDU latency budget. Packets having a higher demand with respect to low latency handling (which needs a faster transmission compared to other packets) may be marked by higher layer to indicate to lower layer to treat such packets with a higher transmission priority, such as prioritizing these packets in a transmission queue.

As an embodiment thereto, a method performed by a wireless device or UE may be provided, wherein the UE performs the steps of: segmenting an application PDU into a plurality of data packets, determining one or a plurality of Quality-of-Service, QoS, parameters associated to the application PDU, determining (102) that different data packets need a different forwarding treatment to comply with the one or the plurality of QoS parameters, and providing a differential forwarding treatment.

The differential forwarding treatment may comprise at least one of mapping the different data packets to different data radio bearers, DRBs and prioritizing data packets with higher demands (in one DRB).

A corresponding Radio Access Network, RAN, node may perform the steps of: receiving a plurality of data packets associated to an application PDU from a User Plane Function, UPF, of a core network, receiving an indicating from the UPF about (a need for) a different forwarding treatment of the different data packets to a wireless device, UE, and forwarding the data packets with a different forwarding treatment (in one DRB).

As described above, the differential forwarding treatment may comprise at least one of mapping the different data packets to different data radio bearers, DRBs and prioritizing data packets with higher demands (in one DRB).

In the following, the solution of mapping the different data packets to a plurality of data radio bearers is primarily discussed.

As explained above, an application PDU is being segmented into a plurality of (user) data packets, e.g. internet protocol, IP, packets or real-time protocol, RTP packets. Further, one or a plurality of Quality-of-Service, QoS, parameters are associated to the application PDU.

The data packets are classified, and a forwarding treatment of the classified packets is performed according to the classification. In order to allow for a different forwarding treatment, a plurality of data radio bearers, DRBs, also being referred to as access network resources, are configured between a UE and a RAN or NB node, wherein those nodes are involved in the forwarding of the data packets of the application PDU. Bay way of example, the PDU application packet is associated to a communication between a first application and a second application (application/service layer) that may reside in the UE and in an application server respectively, the application server connecting to a user plane function, UPF, of or core network that is further connected to the RAN node.

Figure 4:
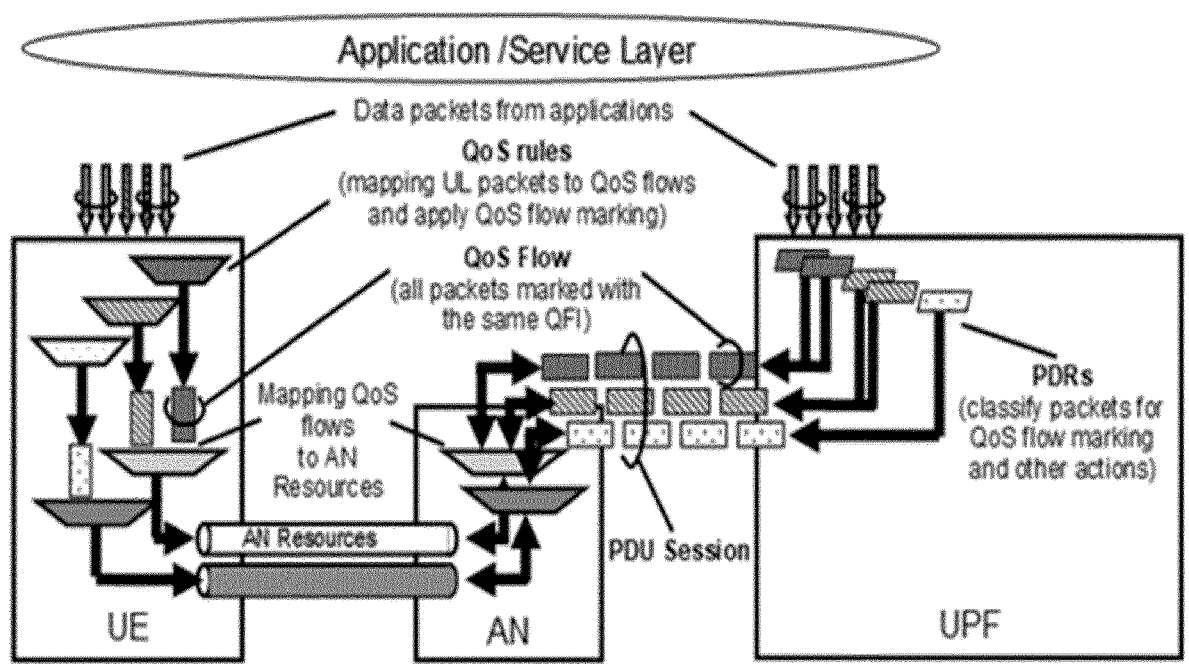
FIG. 4 shows a basic QoS framework according to the 3GPP standard.

Both the UE and the RAN node comprise a Service Data Adaptation Protocol function or layer that performs mapping the different data packets to different data radio bearers, DRBs. As explained above, traditionally the SDAP performs the mapping by using QoS flow identifiers, QFIs, so that for each QFI/User packet pair, the SDAP selects a DRB and sends the data to lower layers. The UPF may thus performs a classification of incoming data packets each to be assigned to one of a plurality of QoS flows e.g. based on a so-called Packet Filter Set. This principle is shows in FIG. 4.

Figure 5:
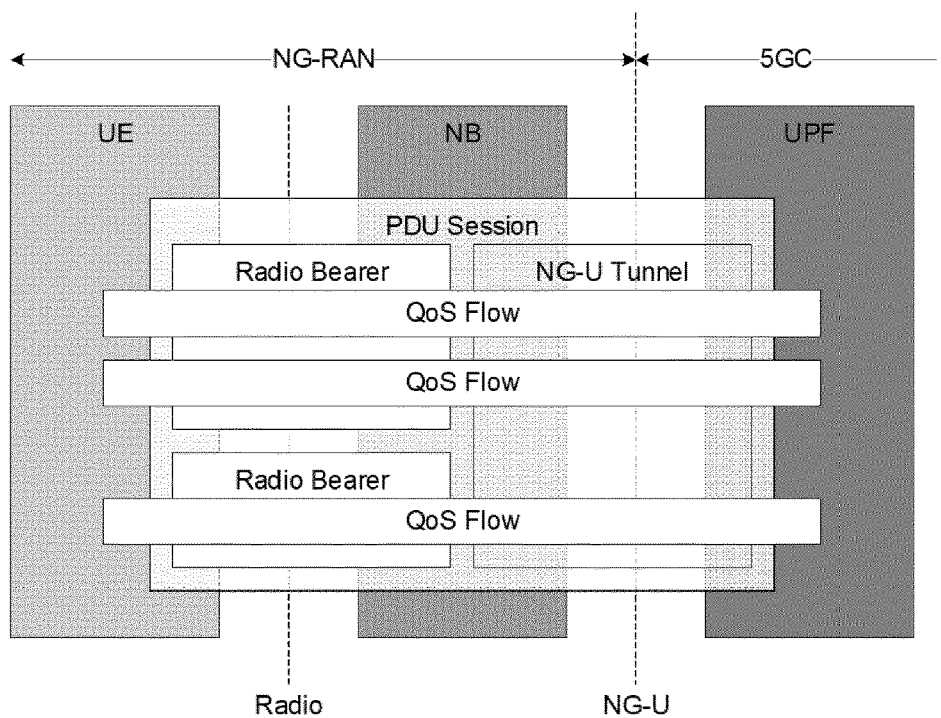
FIG. 5 shows a UE, RAN node and User Plane Function involved in a QoS flow communication.

FIG. 5 shows the UE, RAN node or NB and the UPF being involved in a PDU session. For the PDU session, by way of example, three QoS flows are configured that stretch from the UE to the UPF. Between the UE and the NB, by way of example two Radio Bearers, DRBs are configured, wherein by way of example, a first DRB carries two of the QoS flows and a second DRB carries the third QoS Flow. Further, between the NB and the UPF, a NG-U Tunnels is established carrying all the three QoS flows.

Figure 6:
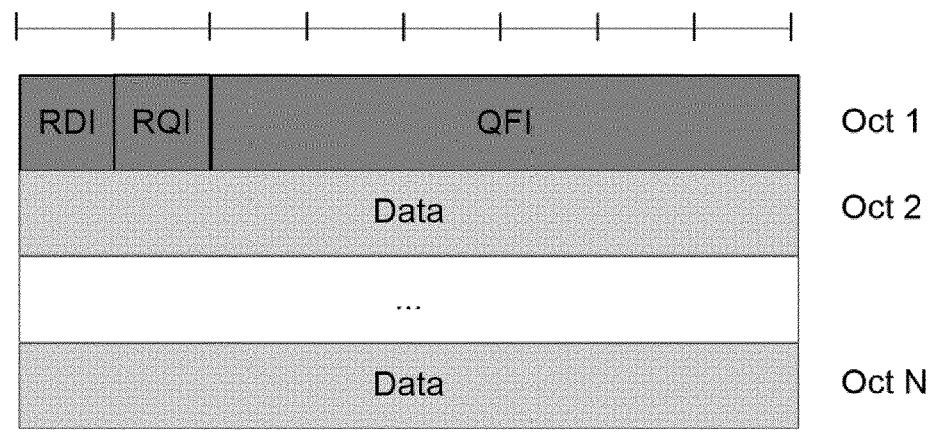
FIG. 6 shows a structure of a download SDAP Data PDU.

FIG. 6 by way of example shows a download SDAP Data PDU format comprising an SDAP header, and a plurality of user data octets, wherein the SDAP header comprises the priority identifier, QFI, and further two information bits RDI and RQI.

As explained above, according to the prior art, all data packets associated to an application PDU are marked with the same QFI and thus will receive the same forwarding treatment.

As discussed above, the invention overcomes this fixed forwarding treatment of all the data packets. In the downlink, DL, the RAN receives a priority identifier from the UPF that may be similar to the QFI as known in the prior art or that may result from a combination of the QFI with any other priority information. The RAN can decide how to perform the mapping of QFIs to one of a plurality of configured DRBs based on the priority identifier/QFI and an individual priority of each data packet. The individual priority may be an individual urgency to deliver the data packet (as discussed above, such urgency may depend on a timing position of the data packet with respect to the whole application PDU). Alternatively, the RAN may change/adapt the QFI provided by the UPF and may then perform the mapping (e.g. a one-to-one mapping) of the data packet/QFI to one of the plurality of configured DRBs.

Similarly, in the uplink, UL, the UE performs the classification/marking of UL user plane traffic. The UE performs such classification/marking based on QoS rules. These QoS rules may be explicitly provided to the UE through the PDU Session Establishment/Modification procedure, pre-configured in the UE or implicitly derived by the UE by applying Reflective QoS. A QoS rule contains among other information, the priority identifier of the associated QoS Flow and a Packet Filter Set. The priority identifier may be similar to the QFI as known in the prior art or that may result from a combination of the QFI with any other priority information. Similar to the RAN node in the DL, the UE can decide how to perform the mapping of QFIs to one of a plurality of configured DRBs based on the priority identifier/QFI and an individual priority of each data packet. The individual priority may be an individual urgency to deliver the data packet. Alternatively, the UE may change/adapt the QFI provided and may then perform the mapping of the data packet/QFI to one of the plurality of configured DRBs.

In an example, the UPF dynamically changes the QFI for each of the IP packets which constitutes an application PDU. Assigning/setting the QFI may be based on one or more of the QoS characteristics such as packet latency budget, QoS characteristics of the application PDU, or a combination of those. The UPF indicates the QFI to the RAN. Then, the RAN may map each IP packet to a corresponding DRB of a plurality of DRBs (also being referred to as access network, AN, resources) established between the RAN and the UE.

An application PDU, e.g. for XR services, may have a bounded latency. This means that the application PDU and thus, all IP packets which form that application PDU should be delivered to the receiver within the latency bound. IP packets may be available at the RAN at different times and that implies that the first received packets have more time to be delivered to the receiver side (e.g. UE). These packets could even experience some retransmissions since there may be time to perform those. On the other hand, those IP packets that arrive last may have less time to be successfully delivered to the receiver side. In this case, there might not be time to perform retransmissions or these packets may require higher priority that the first packets. In the application, this may be referred to as an individual priority of the data packet. Thereto the UE or the RAN node respectively decide how to perform the mapping of IP packets to one of a plurality of configured DRBs based the individual priority of each data packet and on the (global) priority (priority identifier/QFI) associated to the application PDU.

In an example, an application PDU is transmitted into 5 different IP packets. The application PDU should be delivered to the end user within a certain time (T+'application delay budget'), where T is the time in which the application PDU was sent by the transmitter. For this example, it is assumed that 'application delay budget' is 20 ms (milliseconds). The first IP packet is received in RAN at time T+6 ms, and each successive IP packets arrived to the RAN a2 ms after each other i.e. T+8 ms, T+10 ms, T+12 ms, T+14 ms. While the first IP packet has 14 ms packet delay budget to be delivered to the end user, the last IP packet only has 6 ms to be successfully delivered to the end user.

In this scenario, for instance, 2 DRBs may be configured for the given service in the UE or the RAN respectively. A first DRB may be used for those packets which have a certain application delay budget and a second DRB for those packets with a lower application delay budget. The first DRB could be used for packets which have more than or equal to 10 ms packet delay budget, and the second DRB for those packets with less than 10 ms packet delay budget. According to the present example, this would result in that the first 3 packets are mapped into the first DRB and the last 2 packets are mapped into the second DRB. In this example, the application delay budget is used for this purpose.

In an option, the UPF (User Plane Function) may dynamically change the QFI for each of the IP packets associated to an application PDU. Setting the QFI may be based on one or more of the QoS characteristics such as the packet latency budget, QoS characteristics of the application PDU, or a combination of those. The UPF would indicate the QFI to the RAN. Then, the RAN can map each IP packet to the corresponding DRB.

Multiple QoS Flows with the appropriate QoS profiles expressing the urgency to deliver a packet may be configured. The UPF may dynamically map each of the IP packets associated to application PDU, taking information about its delay budget into consideration onto the QoS Flow matching its delivery urgency. Setting the QFI may be based on one or more of the QoS characteristics such as packet latency budget, QoS characteristics of the application PDU, or a combination of those. Then, the RAN can map each IP packet to the corresponding DRB.

In another option, where single QoS flow is used, the UPF may provide a priority indication that is based on an QFI indication as known in 3GPP (marking the packets within a flow with the same QFI) and provide one or more additional fields which provide certain information about priority and/or urgency, and/or provide relevant application PDU information such as e.g. delay budget for the application PDU (maximum time to successfully deliver the application PDU). Based on these indications, the network decides into which DRB those packets are mapped.

The same example as described above applies if two different priority identifiers (QFIs) are used for the same flow. Each priority identifier may be indicated depending on the e.g. application delay budget or any other indication that allows differentiating the priority of the data packets. In this option RAN may configure RAN level identifier used to map the QFI into the DRBs.

It is to be noted that the term "packet delay budget" as used here shall indicate how much time is left for each IP packet to deliver the application PDU to the end user or the other end. Thus, the "application delay budget" is common for all IP packets belonging to one application PDU.

For the uplink, the network indicates to the UE more than one QFI and rules (e.g. Non Access Stratum, NAS filters) for how to use each QFI for a given QoS flow. Alternatively, appropriate Access Stratum, AS, filters and rules may be introduced to achieve the same behaviour.

Similar principles may be applied as described above for the download. Specifically, a priority identifier (QFI) may be used for those packets having a packet delay budget above a certain threshold and a second priority identifier (QFI) if the packet delay budget is below that threshold. Then, differentiated QFI allocation for the same application PDU will make priority indication, e.g., LCID or LCG, in lower layers in UE so that a MAC layer in a network can differentiate resource allocations for different IP packets belonging to the same application PDU.

With the same example as explained above, two priority identifiers (QFIs) and corresponding rules may be signalled to a UE with the same flow. The first priority identifier (QFI) may be used for packets which have more than or equal to 10 ms packet delay budget, and a second QFI for those packets with less than 10 ms packet delay budget. This will lead to SDAP and lower layers assign different DRBs leading to different prioritizations among packets for the same application PDU. The benefit of this multi-QFI signaling to a UE is that all existing prioritization framework in lower layers than SDAP is reused.

In another example, the multiple QFI signaling can be made implicit in a way that a UE is free to allocate QFIs if there is more than one QFI is signalled by a network. Alternatively, this is explicitly signalled to the UE by the network, so that a UE may recognize the possibility of allocating different QFIs according to a UE's decision. Furthermore, the network may indicate to the UE that the signalled QFIs should replace or remove existing QFIs to modify the QFIs a UE can choose. If there is no such indication, a UE shall assume that all of the signalled QFIs shall be used.

Figure 7:
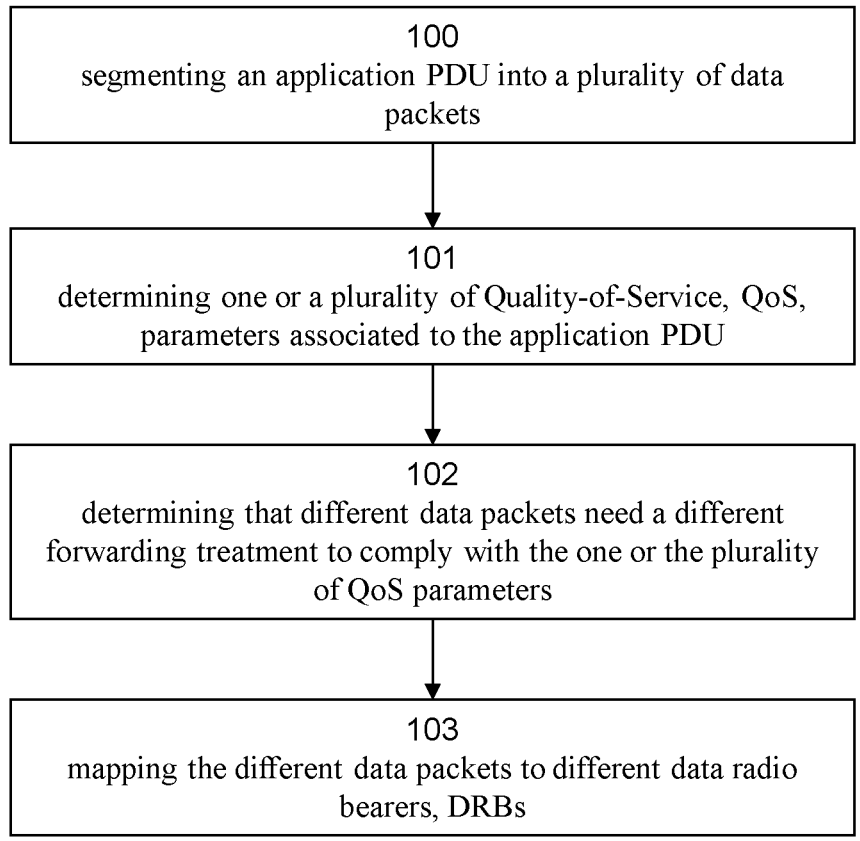
FIG. 7 is flow chart of exemplary steps performed in the UE of FIG. 10.

In accordance with the preceding description FIG. 7 illustrates method, performed by a UE 10, wherein the UE performs the following steps:

Step 100: segmenting an application PDU into a plurality of (user) data packets or receiving a plurality of data packets from an application.

Step 101: determining one or a plurality of Quality-of-Service, QoS, parameters associated to the application PDU.

Step 102: determining that different data packets shall/can be differently treated with respect to forwarding (need a) to comply with the one or the plurality of QoS parameters (e.g. in such a way to apply a least stringent handling and/or to use least access network resources).

Step 103: mapping the different data packets to different data radio bearers, DRBs (the papping may be performed in two steps: firstly, assigning a priority identifier (e.g. QFI) to the data packet and secondly, mapping the data packet to the DRB based on the priority identifier (and further priority information; e.g. the individual data packet priority as described above).

Figure 8:
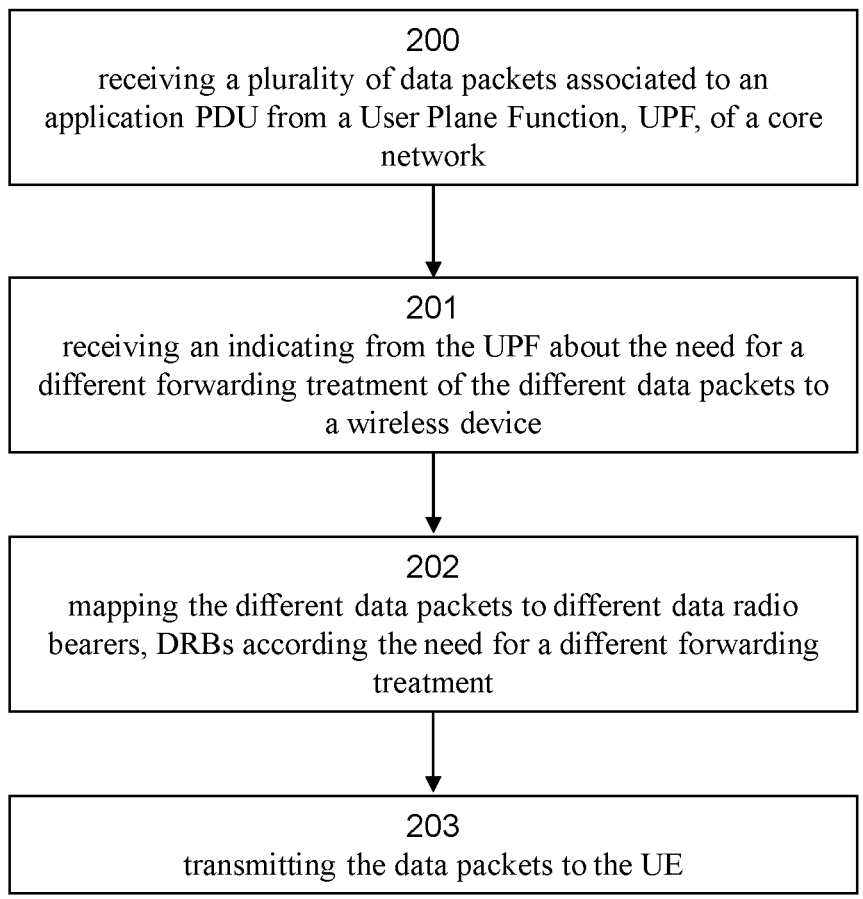
FIG. 8 is a flow chart of exemplary steps performed in the RAN node of FIG. 11.

In accordance with the preceding description FIG. 8 illustrates method, performed by a RAN node 20, wherein the RAN node performs the following steps:

Step 200: receiving a plurality of data packets associated to an application PDU from a User Plane Function, UPF, of a core network.

Step 201: receiving an indicating from the UPF about (a need for) a different forwarding treatment of the different data packets to the UE.

Step 202: mapping the different data packets to different data radio bearers, DRBs according the need for a different forwarding treatment (the papping may be performed in two steps:

firstly, assigning a priority identifier (e.g. QFI) to the data packet and secondly, mapping the data packet to the DRB based on the priority identifier (and further priority information; e.g. the individual data packet priority as described above).

Step 203: transmitting the data packets to the UE.

Figure 9:
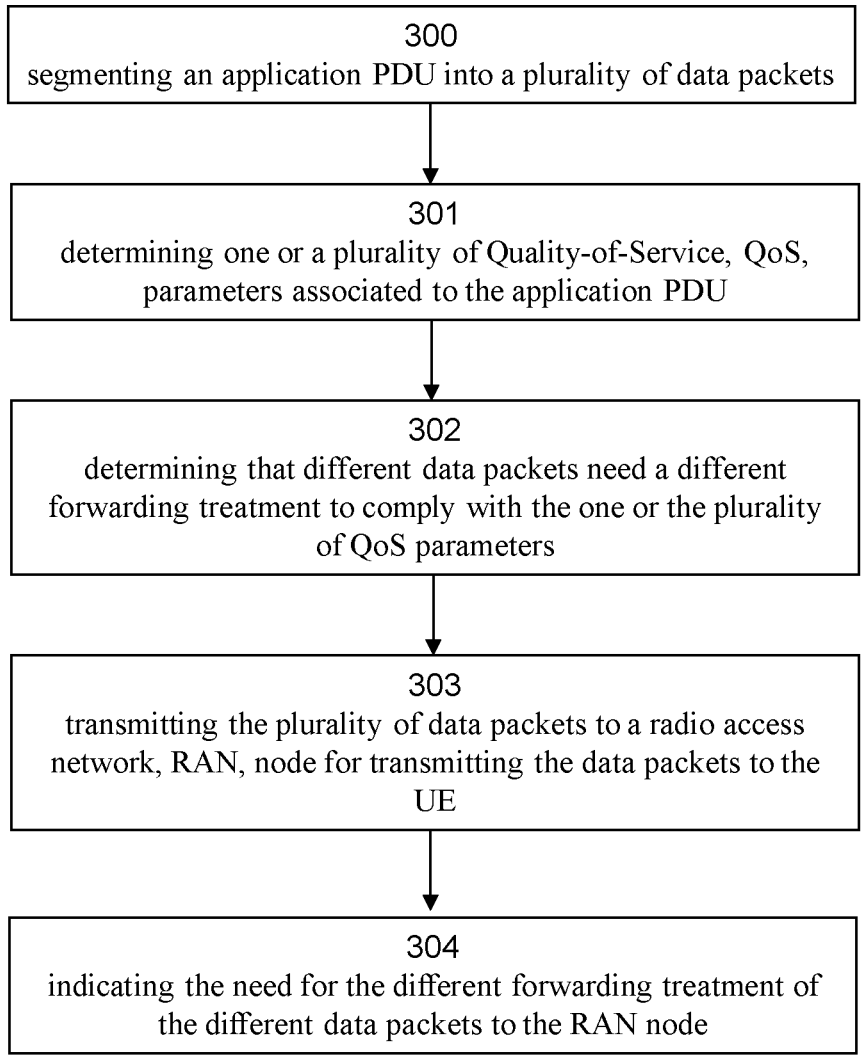
FIG. 9 is a flow chart of exemplary steps performed in the UPF of FIG. 12.

In accordance with the preceding description FIG. 9 illustrates method, performed by a UPF 30, wherein the UPF performs the following steps:

Step 300: segmenting an application PDU into a plurality of data packets,

Step 301: determining one or a plurality of Quality-of-Service, QoS, parameters associated to the application PDU.

Step 302: determining that different data packets need a different forwarding treatment (or shall/can be differently treated) to comply with the one or the plurality of QoS parameters (e.g. in such a way to apply a least stringent handling and/or to use least access network resources).

Step 303: transmitting the plurality of data packets to a radio access network, RAN, node for transmitting the data packets to the UE.

Step 304: indicating the different forwarding treatment (or a need for the different forwarding treatment) of the different data packets to the RAN node.

Figure 10:
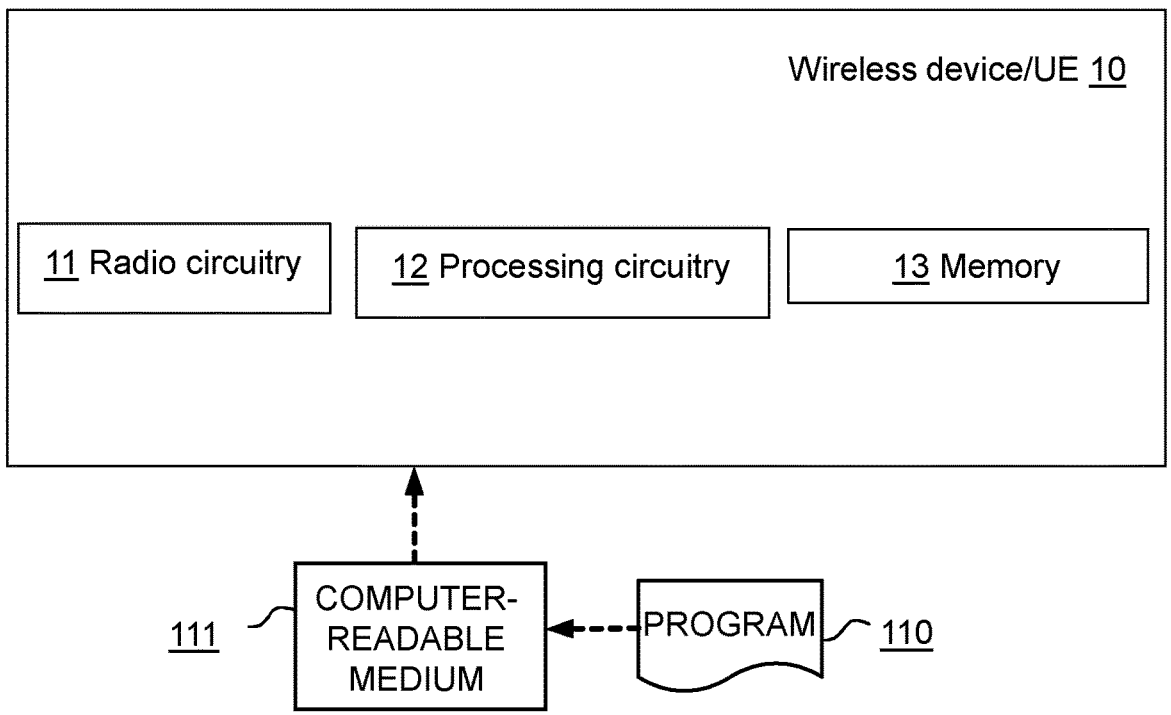
FIG. 10 is an exemplary block diagram of a UE.

As illustrated in FIG. 10, wireless device, WD, or user equipment 10 includes an antenna processing circuitry or radio circuitry 11, device-readable medium 11, processing circuitry 12 and memory 13. The UE further may comprise a user power source and power circuitry. UE can include multiple sets of one or more of the illustrated components for different wireless technologies supported by WD, such as, for example, GSM, WCDMA, LTE, NR, WiFi, WiMAX, or Bluetooth wireless technologies, just to mention a few. These wireless technologies can be integrated into the same or different chips or set of chips as other components within UE 10.

The UE further comprises an Antenna that can include one or more antenna arrays, configured to send and/or receive wireless signals. In certain alternative embodiments, the antenna can be separate from UE 10 and be connectable to UE 10 through an interface or port.

Processing circuitry 12 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other UE 10 components, such as device-readable medium 11, UE 10 functionality. Such functionality can include providing any of the various wireless features or benefits discussed herein. For example, processing circuitry 12 can execute instructions stored in device-readable medium 111 or in memory 110 within processing circuitry 12 to provide the functionality disclosed herein.

Processing circuitry 12 can be configured to perform any determining, calculating, or similar operations (e.g., certain obtaining operations) described herein as being performed by a UE. These operations, as performed by processing circuitry 12, can include processing information obtained by processing circuitry 12 by, for example, converting the obtained information into other information, comparing the obtained information or converted information to information stored by UE 10, and/or performing one or more operations based on the obtained information or converted information, and as a result of said processing making a determination.

Figure 11:
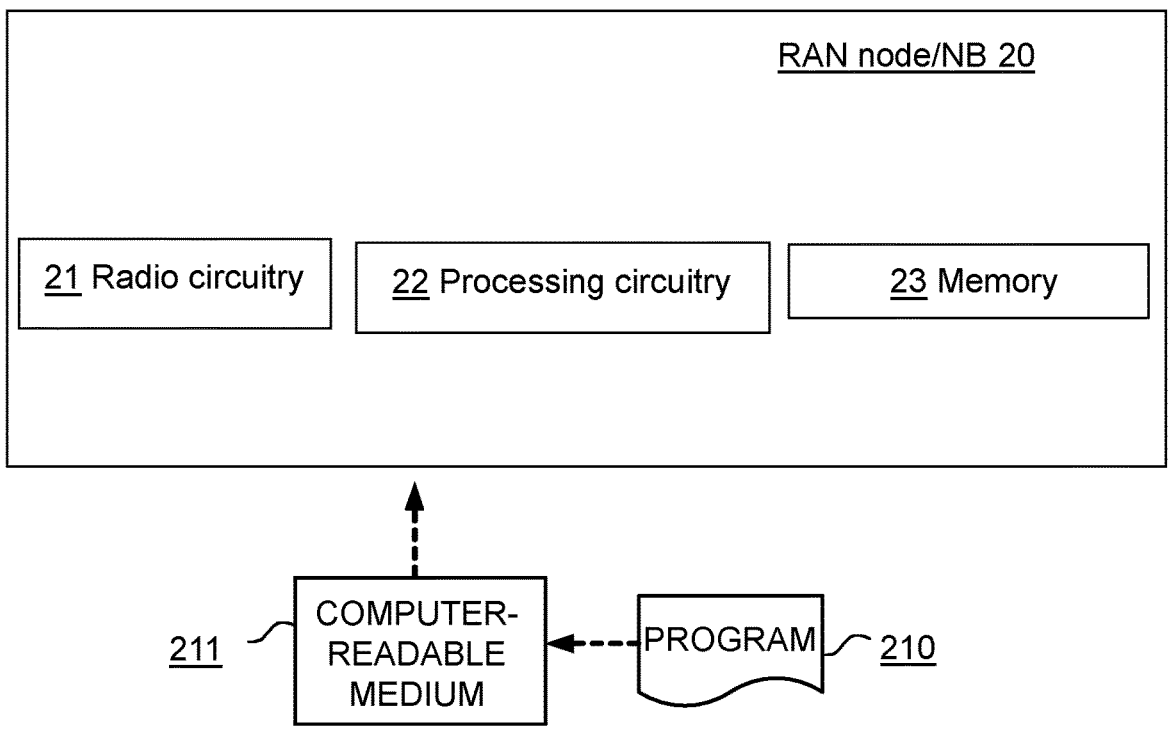
FIG. 11 is an exemplary block diagram of RAN Node.

FIG. 11 shows a block diagram of an exemplary RAN node or NB 20, that may also be referred to as base station or satellite (node) according to various embodiments of the present disclosure, including those described above with reference to other figures. For example, exemplary RAN node 20 can be configured by execution of instructions, stored on a computer-readable medium, to perform operations corresponding to one or more of the exemplary methods described herein. In some exemplary embodiments, RAN node 200 can comprise a base station, eNB, gNB, or one or more components thereof. For example, RAN node 20 can be configured as a central unit (CU) and one or more distributed units (DUs) according to NR gNB architectures specified by 3GPP. More generally, the functionally of RAN node 20 can be distributed across various physical devices and/or functional units, modules, etc.

RAN node 20 can include processor 22 (also referred to as "processing circuitry") that is operably connected to program memory 211 and data memory 210 via a data bus, which can include parallel address and data buses, serial ports, or other methods and/or structures known to those of ordinary skill in the art.

Program memory 211 can store software code, programs, and/or instructions that, when executed by processor 22, can configure and/or facilitate RAN node 20 to perform various operations, including operations corresponding to various exemplary methods described herein. As part of and/or in addition to such operations, program memory 211 can also include software code executed by processor 22 that can configure and/or facilitate RAN node 20 to communicate with one or more other UEs or RAN nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio circuitry 21 and/or core network interface 1050. Data memory 203 can comprise memory area for processor 202 to store variables used in protocols, configuration, control, and other functions of RAN node 200. As such, program memory 211 and data memory 23 can comprise non-volatile memory (e.g., flash memory, hard disk, etc.), volatile memory (e.g., static or dynamic RAM), network-based (e.g., "cloud") storage, or a combination thereof. Processor 22 can include multiple individual processors (not shown), each of which implements a portion of the functionality described above.

Figure 12:
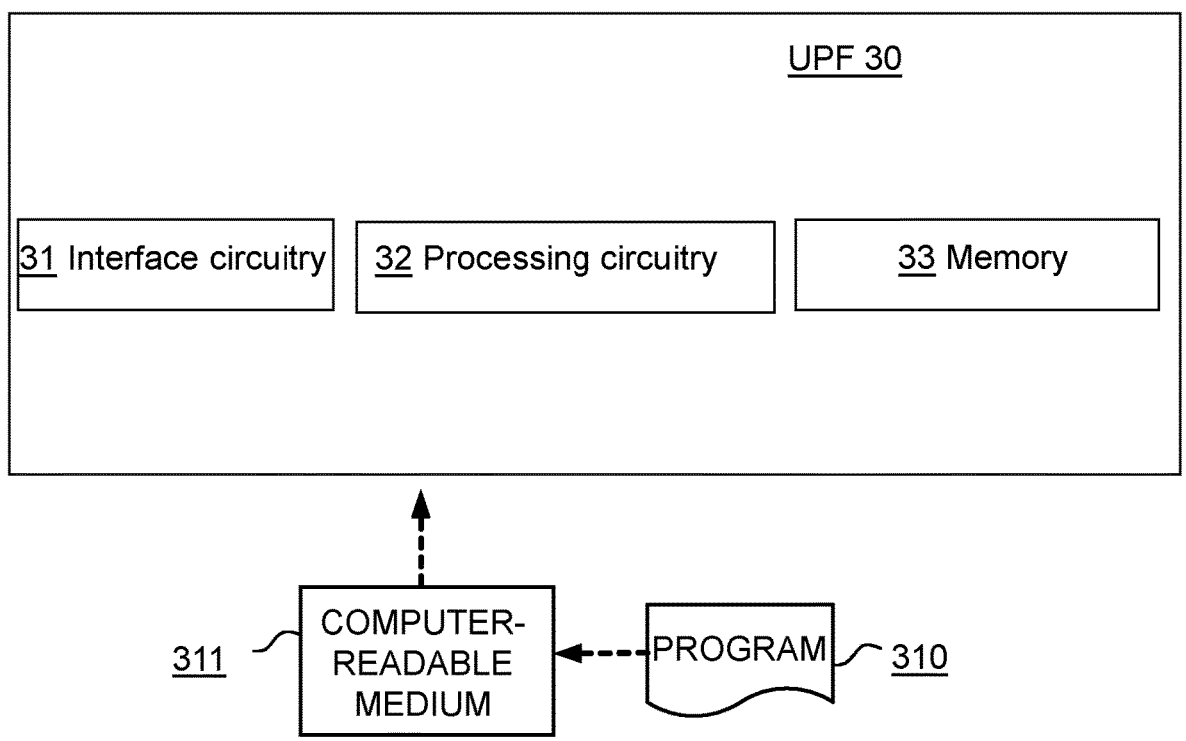
FIG. 12 is an exemplary block diagram of a User Plane Function, UPF.

FIG. 12 shows a block diagram of an exemplary User Plane Function, UPF 30. For example, exemplary UPF 30 can be configured by execution of instructions, stored on a computer-readable medium, to perform operations corresponding to one or more of the exemplary methods described herein.

UPF 30 can include processor 32 (also referred to as "processing circuitry") that is operably connected to program memory 311 and data memory 310 via a data bus, which can include parallel address and data buses, serial ports, or other methods and/or structures known to those of ordinary skill in the art.

Program memory 311 can store software code, programs, and/or instructions that, when executed by processor 32, can configure UPF 30 to perform various operations, including operations corresponding to various exemplary methods described herein. As part of and/or in addition to such operations, program memory 311 can also include software code executed by processor 32 that can configure and/or facilitate UPF 30 to communicate with one or more other UPFs and/or RAN nodes using other protocols or protocol layers, such as one or more of the PDU, 5g UP Encapsulation, UDP/IP layer protocols standardized by 3GPP for LTE, LTE-A, and/or NR. Data memory 303 can comprise memory area for processor 302 to store variables used in protocols, configuration, control, and other functions of UPF 30. As such, program memory 311 and data memory 33 can comprise non-volatile memory (e.g., flash memory, hard disk, etc.), volatile memory (e.g., static or dynamic RAM), network-based (e.g., "cloud") storage, or a combination thereof. Processor 32 can include multiple individual processors (not shown), each of which implements a portion of the functionality described above.

Figure 13:
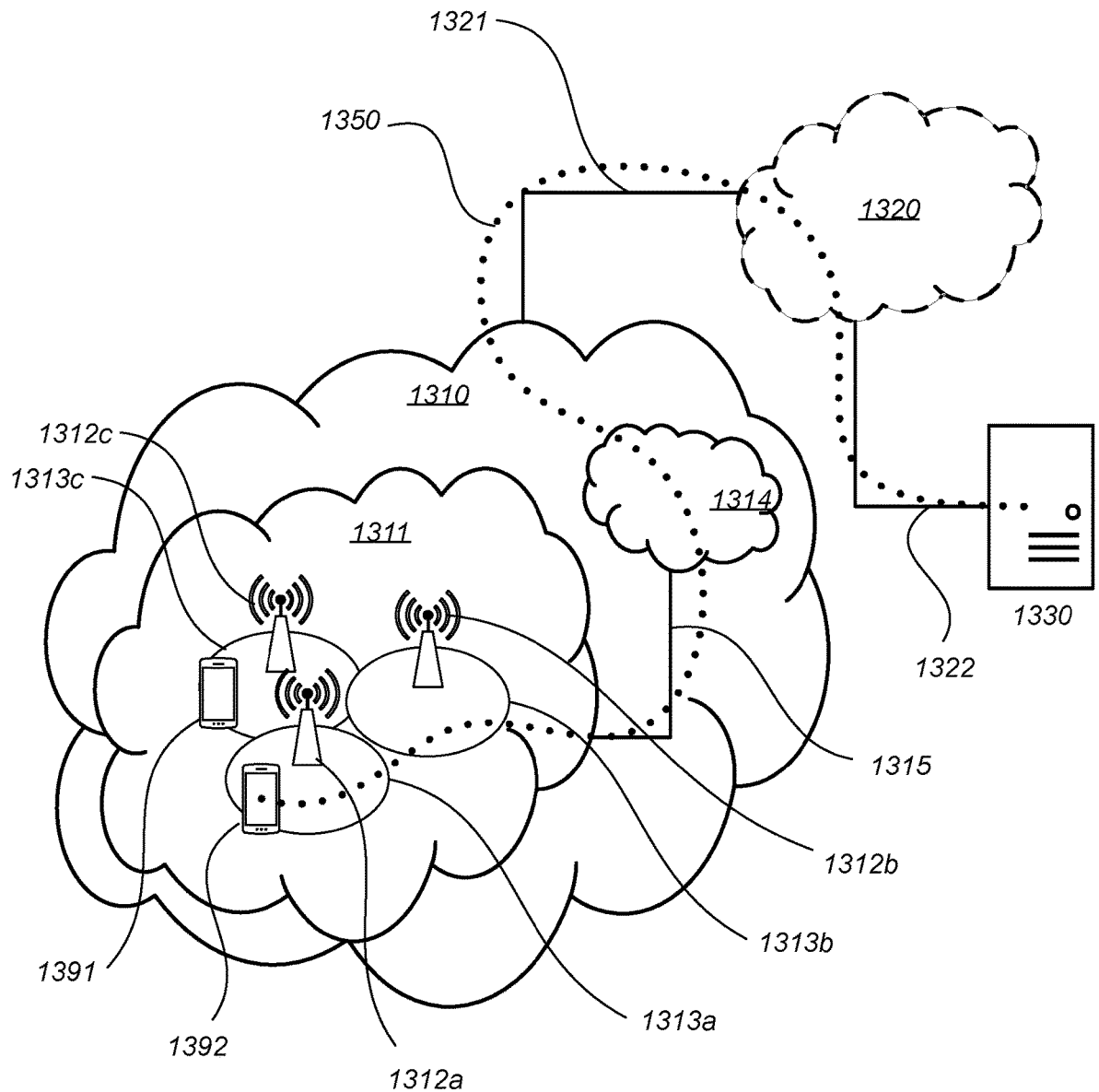
FIG. 13 is a schematic block diagram illustrating a telecommunication network connected via an intermediate network to a host computer.

FIG. 13: Telecommunication Network Connected Via an Intermediate Network to a Host Computer in Accordance with Some Embodiments With reference to FIG. 13, in accordance with an embodiment, a communication system includes telecommunication network 1310 such as the wireless communications network 100, for example, a 3GPP-type cellular network, which comprises access network 1311, such as a radio access network, and core network 1314. Access network 1311 comprises a plurality of network nodes such as any, or both, of the first node 111 and the second node 112. For example, base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A plurality of user equipments, such as the user equipment 130 may be comprised in the wireless communications network 100. In FIG. 13, a first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312. Any of the UEs 1391, 1392 may be considered examples of the user equipment 130.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

In relation to FIGS. 14, 15, 16, 17, and 18, which are described next, it may be understood that a UE is an example of the user equipment 130, and that any description provided for the UE equally applies to the user equipment 130. It may be also understood that the base station may be considered an example of any, or both, of the first node 111 and the second node 112, and that any description provided for the base station equally applies to any, or both, of the first node 111 and the second node 112.

Figure 14:
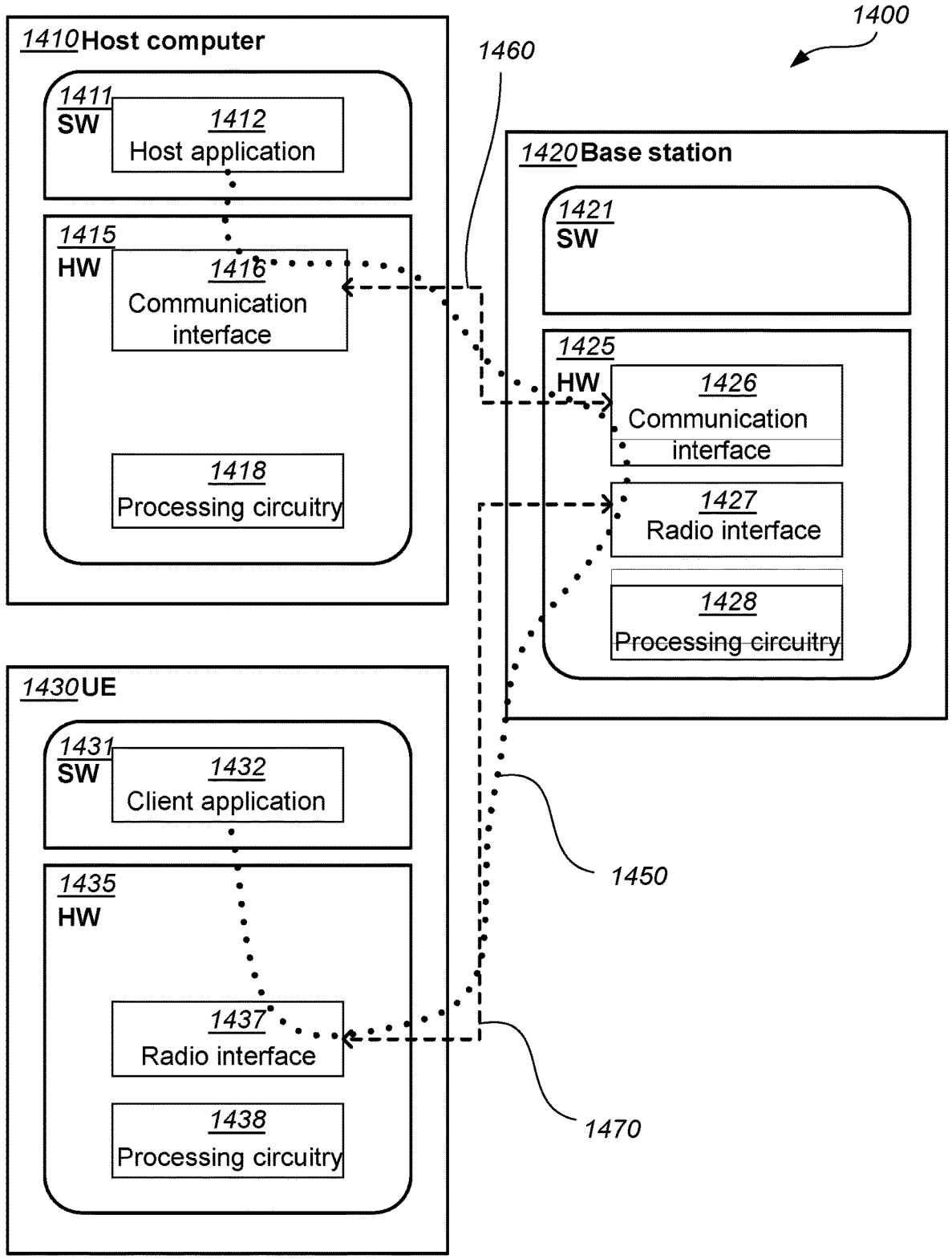
FIG. 14 is a generalized block diagram of a host computer communicating via a base station with a user equipment over a partially wireless connection.

FIG. 14: Host Computer Communicating Via a Base Station with a User Equipment Over a Partially Wireless Connection in Accordance with Some Embodiments Example implementations, in accordance with an embodiment, of the user equipment 130, e.g., a UE, and any, or both, of the first node 111 and the second node 112, e.g., a base station and host computer discussed in the preceding paragraphs will now be described with reference to FIG. 14. In communication system 1400, such as the wireless communications network 100, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes any, or both, of the first node 111 and the second node 112, exemplified in FIG. 14 as a base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with the user equipment 130, exemplified in FIG. 14 as a UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 18: Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

The invention claimed is:

1. A method performed by a wireless device (WD) to forward data of an application packed data unit (PDU), the method comprising:
  segmenting the application PDU into a plurality of data packets;
  determining one or a plurality of Quality-of-Service (QOS) parameters associated to the application PDU;
  determining that different data packets need a different forwarding treatment to comply with the one or the plurality of QoS parameters; and
  mapping the different data packets to different data radio bearers (DRBs), wherein the WD is provided with or determines a maximum application PDU
  delay for delivering the application PDU to over the radio access network (RAN) node to a recipient application function, and
  based on the maximum application PDU delay, the WD determines for each of the different data packets of the application PDU an individual packet delay budget and performs mapping the different data packets to different data radio bearers (DRBs) based on: i) the corresponding individual packet delay budget or ii) a combination of the corresponding individual packet delay budget and further treatment information.

2. The method of claim 1, wherein the plurality of data packets are mapped to a selected QoS flow out of a plurality of QoS flows, wherein each QoS flow is characterized by a corresponding QoS profile.

3. The method of claim 2, wherein
  as result of determining that different data packets within the QoS flow need a different forwarding treatment, assigning different priority identifiers to the different data packets, and
  the mapping of the different data packets to the different DRBs is performed based on the priority identifiers.

4. The method of claim 3, wherein the priority identifiers are QoS flow identifiers (QFIs) or wherein the priority identifiers each result from a combination of a QFI and one or more further priority values.

5. The method of claim 2, further comprising configuring a plurality of QoS flows associated each to an appropriate QoS profile of a plurality of QoS profiles and mapping the different data packets to different QoS flows of the plurality of QoS flows.

6. The method of claim 1, wherein the priority identifiers are associated to an urgency to deliver a packet to one or more of the following: a radio access network, RAN, node, a node in the core network, or a server connected to the core network.

7. The method of claim 1, wherein if the individual packet delay budget, or a value indicative of the combination of the individual packet delay budget and the further treatment information of a data packet is above a certain threshold, marking this data packet with a first priority identifier and/or mapping it to a first DRB, and otherwise marking this data packet with a second QFI and/or mapping it to a second DRB.

8. The method of claim 7, wherein the marking and/or mapping is performed by a service data adaptation protocol (SDAP) function within the WD.

9. The method claim 2, further comprising receiving from a core network node a plurality of QFIs to be applied to the data packets and rules for how to use each QFI for the plurality of data packets.

10. A wireless device (WD), the WD comprising:
radio interface circuitry configured to communicate with a network node via at least one cell; and
processing circuitry operably coupled to the radio interface circuitry wherein the WD is configured to perform a method comprising:
segmenting an application packed data unit (PDU) into a plurality of data packets;
determining one or a plurality of Quality-of-Service (QOS) parameters associated to the application PDU;
determining that different data packets need a different forwarding treatment to comply with the one or the plurality of QoS parameters; and
mapping the different data packets to different data radio bearers (DRBs), wherein the WD is provided with or determines a maximum application PDU
delay for delivering the application PDU to over the radio access network (RAN) node to a recipient application function, and
based on the maximum application PDU delay, the WD determines for each of the different data packets of the application PDU an individual packet delay budget and performs mapping the different data packets to different data radio bearers (DRBs) based on: i) the corresponding individual packet delay budget or ii) a combination of the corresponding individual packet delay budget and further treatment information.

11. The WD of claim 10, wherein the plurality of data packets are mapped to a selected QoS flow out of a plurality of QoS flows, wherein each QoS flow is characterized by a corresponding QoS profile.

12. The WD of claim 11, wherein
as result of determining that different data packets within the QoS flow need a different forwarding treatment, assigning different priority identifiers to the different data packets, and
the mapping of the different data packets to the different DRBs is performed based on the priority identifiers.

13. The WD of claim 12, wherein the priority identifiers are QoS flow identifiers (QFIs) or wherein the priority identifiers each result from a combination of a QFI and one or more further priority values.

14. The WD of claim 11, wherein the WD is further configured to configure a plurality of QoS flows associated each to an appropriate QoS profile of a plurality of QoS profiles and mapping the different data packets to different QoS flows of the plurality of QoS flows.

15. The WD of claim 11, wherein the WD is further configured to receive from a core network node a plurality of QFIs to be applied to the data packets and rules for how to use each QFI for the plurality of data packets.

16. The WD of claim 10, wherein the priority identifiers are associated to an urgency to deliver a packet to one or more of the following: a radio access network, RAN, node, a node in the core network, or a server connected to the core network.

17. The WD of claim 10, wherein if the individual packet delay budget, or a value indicative of the combination of the individual packet delay budget and the further treatment information of a data packet is above a certain threshold, marking this data packet with a first priority identifier and/or mapping it to a first DRB, and otherwise marking this data packet with a second QFI and/or mapping it to a second DRB.

18. The WD of claim 17, wherein the marking and/or mapping is performed by a service data adaptation protocol (SDAP) function within the WD.

\* \* \* \* \*